United States Patent [19]

Schoubye

[11] Patent Number: 6,149,886
[45] Date of Patent: *Nov. 21, 2000

[54] PROCESS FOR THE DESULPHURIZATION OF GASEOUS SUBSTRATE

[75] Inventor: Peter Schoubye, Horsholm, Denmark

[73] Assignee: Haldor Topsoe A/S, Lyngby, Denmark

[*] Notice: This patent issued on a continued prosecution application filed under 37 CFR 1.53(d), and is subject to the twenty year patent term provisions of 35 U.S.C. 154(a)(2).

[21] Appl. No.: 09/001,556

[22] Filed: Dec. 31, 1997

Related U.S. Application Data

[60] Provisional application No. 60/035,281, Jan. 6, 1997.

[51] Int. Cl.$^7$ .............................. B01D 53/48; C01B 17/74
[52] U.S. Cl. ................................ 423/242.1; 423/244.09; 423/522; 423/529; 423/542
[58] Field of Search ..................... 423/522, 529, 423/542, 242.1, 244.09

[56] References Cited

U.S. PATENT DOCUMENTS

| | | | |
|---|---|---|---|
| 3,008,804 | 11/1961 | Rowedder | 423/522 |
| 4,296,088 | 10/1981 | Staüffer | 423/533 |
| 4,478,808 | 10/1984 | Matros et al. | 423/522 |
| 5,108,731 | 4/1992 | Schoubye | 423/522 |
| 5,198,206 | 3/1993 | Schoubye | 423/522 |
| 5,658,541 | 8/1997 | Matros et al. | 423/210 |

FOREIGN PATENT DOCUMENTS

| | | |
|---|---|---|
| 975927 | 10/1975 | Canada . |
| 145817B | 3/1983 | Denmark . |

OTHER PUBLICATIONS

Y.S. Matros, *Catalytic Processes Under Unsteady State Conditions*, Chapter 7, "Non–Steady–State Method For Sulphur Dioxide Oxidation In Sulphuric Acid Production"; pp. 283–321; Amsterdam/New York 1989.

*Primary Examiner*—Steven P. Griffin
*Assistant Examiner*—Timothy C Vanoy

[57] ABSTRACT

A process for desulfurization of a gaseous substrate containing $O_2$, $SO_2$, $SO_3$, $H_2SO_4$, $H_2S$, $CS_2$, COS and/or organic sulfur-containing components. The combustible components are oxidized catalytically into $H_2O$, $CO_2$, and $SO_2$. The $SO_2$ is further oxidized catalytically into $SO_3$, which in the presence in the substrate of at least an equivalent amount of $H_2O$ in the gas, is further hydrated and condensed as sulfuric acid. The process is conducted in two towers that are connected in series, each tower being loaded with a layer of inert material below a layer of oxidization catalyst preferably consisting of an acid resistant material with parallel, vertical channels. A preferred catalyst includes vanadium oxide supported on a silica carrier material and promoted with alkali metals. The process includes reversing a direction of gas flow in the towers after periods of about 1–40 minutes. The temperature in layers of the oxidation catalyst, preferably consisting of an acid resistant material with parallel, vertical channgels in the towers is maintained in a range of 300–500° C. The temperature of the gas stream leaving the towers is at least 50° C. below the $H_2SO_4$ dew point of the process gas after oxidation of the sulfur content in the feed gas. Condensed sulfuric acid is drained off from the bottom of each of the towers.

11 Claims, 1 Drawing Sheet

PROCESS FOR THE DESULPHURIZATION OF GASEOUS SUBSTRATE

This application claims the benefit of U.S. provisional application Ser. No. 60/035,281, filed on Jan. 6, 1997.

BACKGROUND OF THE INVENTION

1. Field of the Invention

The present invention is directed to desulfurization of a gaseous substrate.

2. Description of the Prior Art

It is well known in the performance of gas phase reactions to heat up the reactant gas mixture to the reaction temperature by regenerative heat exchange with hot exit gas after the reaction. The combination of gas phase reaction with regenerative heat exchange, which is also denoted unstationary-state process, is, in particular, advantageous compared to the use of recuperative heat exchange, such as a shell-and-tube heat exchanger, in processes in which the adiabatic temperature increase caused by the reaction is smaller than about 25% of the increase in temperature required to heat up the inlet gas to the reaction temperature. This is because regenerative heat exchangers usually are less expensive than recuperative heat exchangers when the thermal heat exchange efficiency is higher than 75%.

Thermal efficiency up to 98% is typically achieved in regenerative heat exchange, which cannot be achieved practically by recuperative heat exchange. DK Patent Application No. 0375/77 and Yu. Sh. Matros in "Catalytic Processes under Unsteady State Conditions", Elsevier, Amsterdam/New York, 1989, disclose examples on use of regenerative heat exchange combined with reactions such as catalytic oxidation of $SO_2$ or combustible components in off gases in which the adiabatic temperature increase by the oxidation reactions are from a few degrees up to 100–200° C. In known applications in which $SO_2$ is oxidized into $SO_3$, the process gas is free of $H_2O$ and $H_2SO_4$-vapor in order to avoid condensation of sulfuric acid in the regenerative heat exchanger.

SUMMARY OF THE INVENTION

In the process of the present invention, the use of regenerative heat exchange in combination with oxidation of $SO_2$ into $SO_3$ is extended to comprise the treatment of gases containing $H_2O$, which may be present either as $H_2O$ vapor in the inlet gas or formed in the oxidation of other combustibles and/or added as steam or water spray in the process. $H_2O$ is thereby present in amounts being at least equivalent to the amount of $SO_3$ formed in the process. The process treats gases which may contain $SO_2$, $SO_3$, $H_2SO_4$ present as vapor or aerosol, organic combustible components including organic components containing sulfur, $H_2S$, COS and $CS_2$, which are oxidized catalytically at about 400° C.

Accordingly, the invention provides a process for the desulfurization of a gaseous substrate containing $O_2$, $SO_2$, $SO_3$, $H_2SO_4$, $H_2S$, $CS_2$, COS and/or organic sulfur-containing components, in which the combustible components are oxidized catalytically into $H_2O$, $CO_2$, and $SO_2$ that is further oxidized catalytically into $SO_3$, which, in presence in the substrate of at least an equivalent amount of $H_2O$ in the gas, is further hydrated and condensed as sulfuric acid. The process is conducted in two towers that are connected in series.

Each tower is loaded with a layer of inert material below a layer of oxidization catalyst. The inert layer in each of the two towers is a 0.5–5 meter high layer of acid resistant ceramic bodies with a volume to surface ratio of 1.5 to 15 mm. The bodies are shaped preferably as spheres, rings or saddles or as material obtained by crushing larger blocks of an acid resistant material. According to a preferred embodiment, the layer of inert material in each of the two towers is a bed of blocks of an acid resistant material with parallel, vertical channels with a diameter of about 3 to 20 mm.

The process includes the steps of reversing a direction of gas flow in the towers after periods of approximately 1 to 40 minutes, and maintaining a temperature in layers of the oxidation catalyst in the towers in a range of about 300 to about 500° C. According to various embodiments of the invention, maintaining the temperature in the layers of oxidation catalyst comprises at least one of heating the gas stream, cooling the gas, or purging up to 20% of the gas.

The temperature of a gas stream leaving the towers is at least 50° C. below the $H_2SO_4$ dew point of the gas after oxidation of the sulfur content in the feed gas. Condensed sulfuric acid is drained off from each of the towers.

The mass velocity of the gas in each of the two towers is in the range of about 1000–10000 $Nm^3/h$ per $m^2$ of tower cross section. Preferably, the sulfuric acid catalyst is vanadium oxide supported on a silica carrier material and promoted with alkali metals. The alkali metal preferably is selected from the group consisting of potassium, sodium, and cesium.

Formation of sulfuric acid aerosol in the condensation of $H_2SO_4$ vapor by cooling of the gas in the inert beds is suppressed by controlling a number of particles in the gas stream to a concentration of about $10^{10}$–$10^{12}$ particles per $Nm^3$ per 1000 ppm of $SO_3$ in the gas. Particles added to the gas stream preferably are produced by thermal combustion of a silicon oil in a stream of air that is mixed into the gas.

According to a further aspect of the invention, the temperature in the catalytic beds of the towers is controlled by purging a fraction of the hot gas through a line in which the gas is cooled to about 400° C., remaining $SO_2$ being converted to $SO_3$ in the catalytic reactor. The gas is further cooled to about 220–290° C. and finally cooled to about 100° C. in a sulfuric acid condenser before the gas is united with the main stream of gas.

The gas to be treated in the process is fed into the regenerative heat exchange beds at a temperature at least 50° C. below the sulfuric acid dew point of the gas exiting the catalyst layers, whereby all of the formed $SO_3$ is hydrated into $H_2SO_4$ vapor, most of which is condensed in the lower section of the heat exchange beds. Hereby, the heat of hydration of $SO_3$ and condensation of sulfuric acid is utilized in the regenerative heat exchange for heating up the cold inlet gas to the required reaction temperature. Furthermore, practically all of the content of $H_2SO_4$ in the gas can be recovered and drained off below the heat exchange beds by cooling the exit gas to a temperature of below approximately 100° C. and adding particles for heterogeneous nucleation control of the condensation in order to suppress the formation of sulfuric acid aerosol in the condensation.

The heat exchange beds are made of acid resistant material. The heat exchange material used in the zone of the heat exchange beds, in which acid adhering to the material will be re-evaporated during the heat-up period of the cycle time, shall have low or no open porosity, or have a glazed surface, because the re-evaporation of acid decreases the thermal efficiency.

Other features and advantages of the present invention will become apparent from the following description of the invention which refers to the accompanying drawing.

DETAILED DESCRIPTION OF THE PREFERRED EMBODIMENTS

Figure 1:
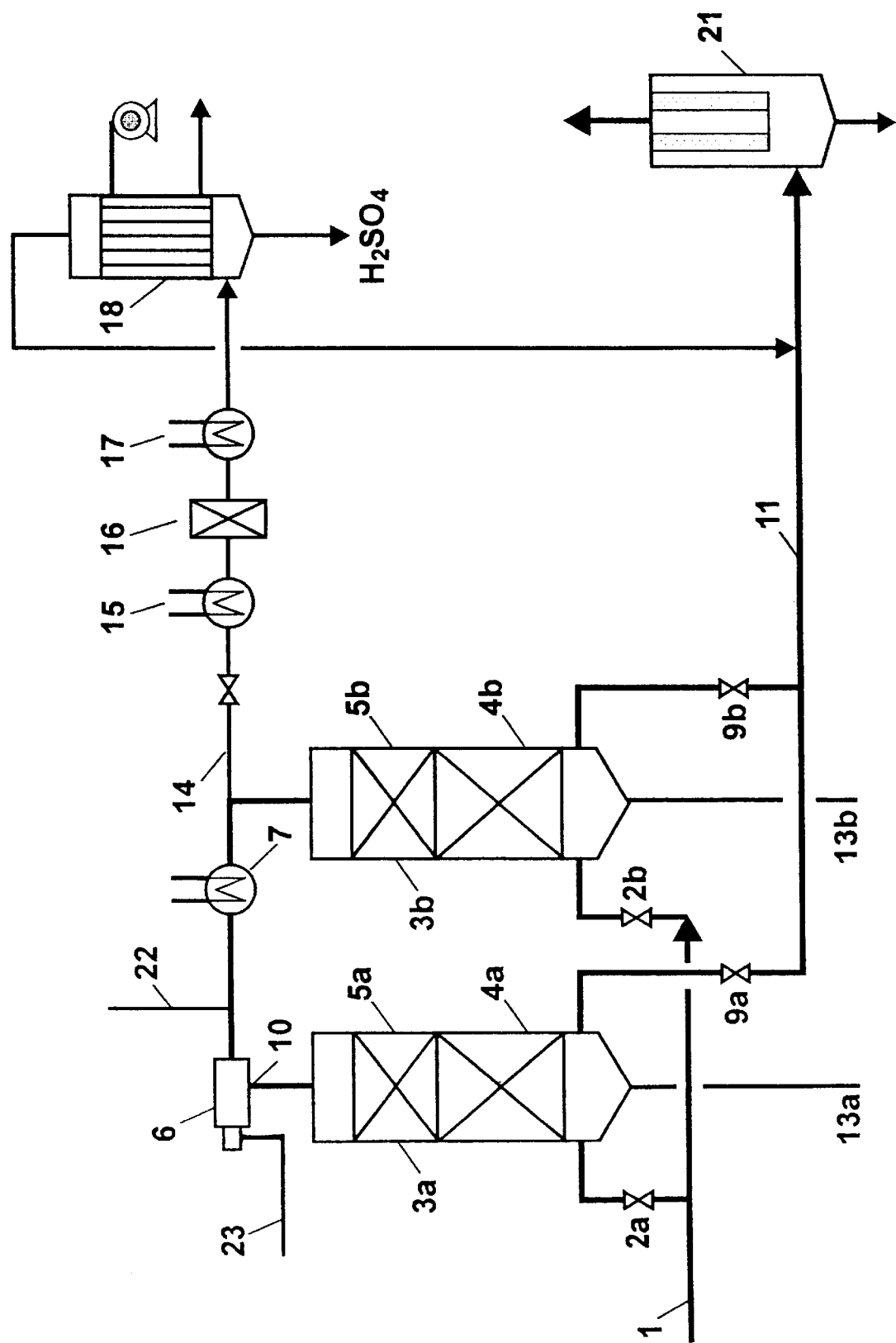
FIG. 1 shows a simplified flow diagram of a single absorption sulfuric acid plant according to a preferred embodiment of the present invention.

The invention is described in greater detail by reference to FIG. 1 showing desulfurization of off gas from the absorber of a single absorption sulfuric acid plant according to a specific embodiment. The off gas contains $N_2$, $O_2$, $CO_2$ and typically 0.1–0.3% $SO_2$, 0–10 ppm $SO_3$ and 2–100 ppm $H_2SO_4$ as aerosol. It contains no $H_2O$. The gas is treated in two series-connected towers 3a and 3b shown in FIG. 1. Each of the towers is connected at the bottom of the tower (1) to an inlet line 1 with lines equipped with on-off valves 2a and 2b, and (2) to an outlet line 11 with lines equipped with on-off valves 9a and 9b and to product lines 13a and 13b, respectively.

$H_2O$ in the form of steam or water spray is added either to the gas in line 1 or in line 10 via line 22 that connects the top of the two towers. The amount of $H_2O$ added to the gas is equal to the amount that gives a molar ratio of $H_2O$ to $SO_2+SO_3$ of at least 1.00 (i.e., no excess $H_2O$), or up to 2% $H_2O$ after total conversion of SOx to $H_2SO_2$.

The direction of gas flow through the towers is reversed every 5–15 minutes by alternately having valves 2a+9b open and valves 2b+9a closed, and having valves 2a+9b closed and valves 2b+9a open. Each of the towers is loaded with a 0.5–1 m layer 5a and 5b of sulfuric acid catalyst, in the form of 20 mm rings, on top of a 1–2 meter layer 4a and 4b of acid resistant ceramic bodies in the form of 20–30 mm balls, saddles or Raschig rings. The gas mass velocity in the towers is of the order of 2000–3000 $Nm^3$ gas per $m^2$ per hour. The temperature in the catalyst layers is adjusted to 350–450° C. by the gas heater 6 supplied by fuel gas line 23. Gas cooler 7 and the purge line 14 are not used in this embodiment of the invention. Alternatively, purge gas can be cooled in cooler 15, catalytically oxidized as known conventionally in reactor 16, cooled again in cooler 17, and subjected to a wet acid process in conventional reactor 18 to further produce $H_2SO_4$.

In operation with off gases, the temperature profiles in each of the two towers will, in principle, be moving back and forth between two positions during each period of t minutes between changes of the position of the valves. A distance z of movement of the temperature profile during a period between shifts of the valves is approximately $z=t*G*cp/(W*cw)$, where W is the bulk weight of the ceramic bodies, cw and cp the heat capacities of the ceramics and the gas and G the gas mass velocity in the tower.

The following reactions take place in each of the towers:
Catalytic oxidation of $SO_2$, $SO_2+1/2O_2=SO_3$, in the catalytic zone;
Gas phase hydration of $SO_3$ into $H_2SO_4$ vapor in the ceramic zone where the temperatures are in the range 150–350° C.;
Condensation of $H_2SO_4$ with some $H_2O$ in the zone of the ceramic bodies in which the temperature is below the sulfuric acid dew point of the gas phase.

In order to obtain nearly complete condensation of the $H_2SO_4$ vapor, the exit temperature of the gas at the bottom of the layer with ceramic bodies must be below the temperature at which the $H_2SO_4$ vapor pressure in equilibrium with the condensed acid is below a certain limit, e.g., $2*10^{-6}$ atm. With 1–2% excess $H_2O$ in the gas phase, $pH_2SO_4$ will be $\leq 2*10^{-6}$ atm with outlet temperatures below 90–100° C. and 1–2% $H_2O$ in the gas. The strength of the condensed acid is approximately 70% $H_2SO_4$.

Some of the sulfuric acid will condense as acid aerosol in the gas phase. The aerosol can be removed in an aerosol filter 21. The amount of aerosol is suppressed by adding $10^{11}$–$10^{12}$ particles/$Nm^3$ per 1000 mole ppm SOx in the gas to the process gas in the line 10. The particles are produced by oxidation of silicon oil in a small stream of air that is mixed into the process in line 10.

In desulfurization of off gas containing $H_2S$ and $CS_2$ from production of viscose according to the invention, the off gas with a content of $H_2S+CS_2$ resulting in an adiabatic temperature rise of up to 120° C. of the gas by reacting the $H_2S$ and $CS_2$ into $H_2SO_4$-vapor is treated in the process shown in FIG. 1, with differences from the embodiment described previously, as follows:

(1) The catalyst zone consists of a layer of commercially available, sulfur-resistant combustion catalyst from Haldor Topsoe A/S, placed between the layer of acid resistant bodies and the layer of sulfuric acid catalyst.
(2) A surplus of $H_2O$ will usually be present so that addition of $H_2O$ is not necessary.
(3) When the heat of reacting $H_2S+CS_2$ in the gas exceeds 60–80° C., the gas exit temperature is kept below 100° C. by purging up to 15–20% of the process gas by line 14 from line 10 connecting the two towers.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A process for desulfurizing a feed gas containing $O_2$, $SO_2$, $SO_3$, $H_2SO_4$, $H_2S$, $CS_2$, COS and/or organic sulfur-containing components, the process comprising the steps of:

i) adjusting the water content in the feed gas to provide sufficient water for the production of $H_2SO_4$;

ii) passing the feed gas into a first of two serially-arranged catalytic heat exchange reactors, wherein each of the catalytic heat exchange reactors contains a catalyst unit disposed over a heat exchange unit, so that the feed gas absorbs heat from the heat exchange unit and passes into the catalyst unit where the oxidizable components in the feed gas are catalytically oxidized into $SO_2$, $H_2O$ and $CO_2$ at a temperature in the range of 300–500° C.;

iii) discharging the oxidized feed gas from the first of the two catalytic heat exchange reactors and injecting the oxidized feed gas into the second catalyst tower so that the oxidized feed gas passes first through the catalyst unit and residual amounts of $SO_2$ are oxidized into $SO_3$ at a range of 300–500° C.;

iv) passing the $SO_3$-containing feed gas into the heat exchange unit within the catalytic heat exchange reactor where the $SO_3$-containing feed gas is cooled and the water within the feed gas hydrolyzes the $SO_3$ into $H_2SO_4$, which is condensed and removed from the second catalytic heat exchange reactor;

v) discharging treated gas from the second catalyst tower at a temperature that is at least 50° C. below the $H_2SO_4$ dew point of the process gas after oxidation of the sulfur content in the feed gas;

wherein the direction of the feed gas flow is cyclically changed, after a period of about 1 to 40 minutes, so that the feed gas is injected into the catalytic heat exchange reactor from which the treated gas was discharged in the previous cycle and first passes through the heat exchange unit in this catalytic heat exchange reactor.

2. The process of claim 1, wherein temperature in the catalyst unit is maintained by at least one of heating the feed gas, cooling the feed gas, or purging up to 20% of the feed gas.

3. The process of claim 1, wherein a mass velocity of the feed gas in each of the two reactors is 1000–10000 Nm3/h per m$^2$ of reactor cross section.

4. The process of claim 1, wherein the heat exchange unit comprises an inert layer in each of the two reactors made up of a 0.5–5 meter high layer of acid resistant ceramic bodies with a volume to surface ratio of 1.5 to 15 mm and shaped as spheres, rings or saddles or as material obtained by crushing larger blocks of an acid resistant material.

5. The process of claim 1, wherein the heat exchange unit comprises a layer of inert material in each of the two reactors made up of a bed of blocks of an acid resistant material with parallel, vertical channels with a diameter of 3–20 mm.

6. The process of claim 1, wherein the oxidation catalyst is vanadium oxide supported on a silica carrier material and promoted with alkali metals.

7. The process of claim 6, wherein the alkali metal is selected from the group consisting of potassium, sodium, and cesium.

8. The process of claim 1, wherein particles are added to the feed gas stream, and formation of sulfuric acid aerosol in the condensation of $H_2SO_4$ vapor by cooling of the feed gas in the inert beds is suppressed by controlling a number of the particles in the feed gas stream to a concentration of about $10^{10}$–$10^{12}$ particles per Nm$^3$ per 1000 ppm of $SO_3$ in the feed gas.

9. The process of claim 1, wherein particles are added to the feed gas for sulfuric acid condensation, and the particles are produced by thermal combustion of a silicon oil in a stream of air that is mixed into the feed gas.

10. The process of claim 1, further comprising the step of adjusting the content of water in the feed gas between steps (ii) and (iii).

11. The process of claim 1, wherein the temperature in the catalyst units in the catalytic heat exchange reactors is controlled by purging a portion of the process gas from the partially treated feed gas at a location between the two catalytic heat exchange reactors, wherein this portion of the purged process gas is passed through a heat exchanger where it is cooled to about 400° C.; passed through a catalytic reactor where the $SO_2$ in the gas is converted into $SO_3$; passed through a heat exchanger where it is cooled to a temperature in the range of about 220° C. to about 290° C., and passed though a sulfuric acid condenser where it is cooled to about 100° C. and sulfuric acid is condensed from this gas, and reunited with the treated feed gas.

* * * * *